Figure 4:
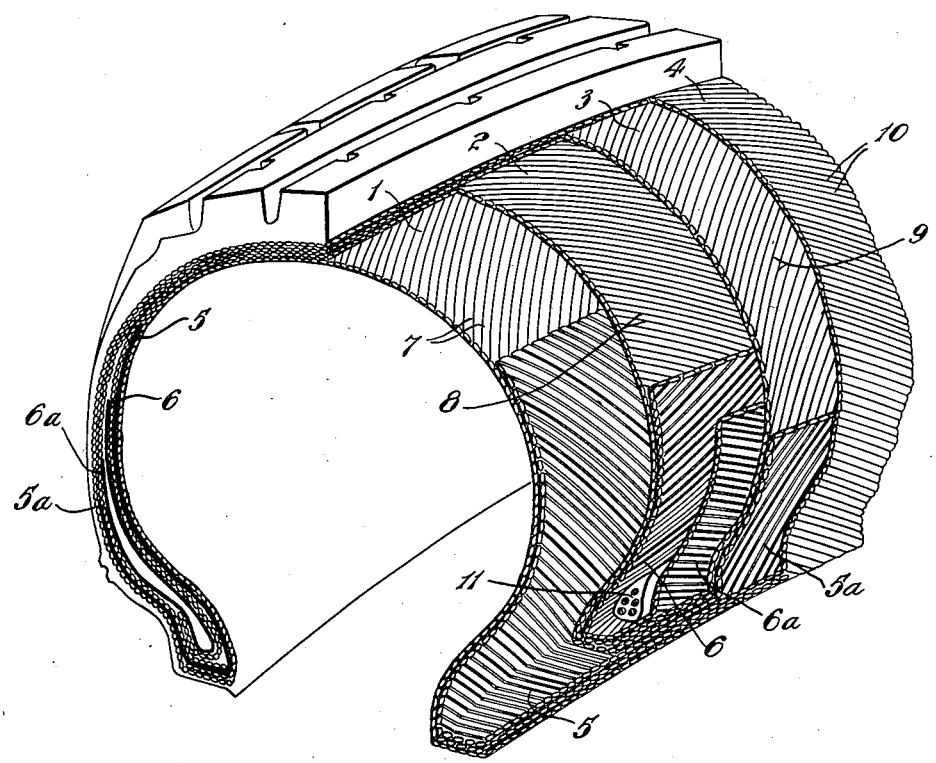

Dec. 8, 1936.   F. G. W. KING   2,063,105
PNEUMATIC TIRE COVER
Filed Feb. 14, 1936   3 Sheets-Sheet 1
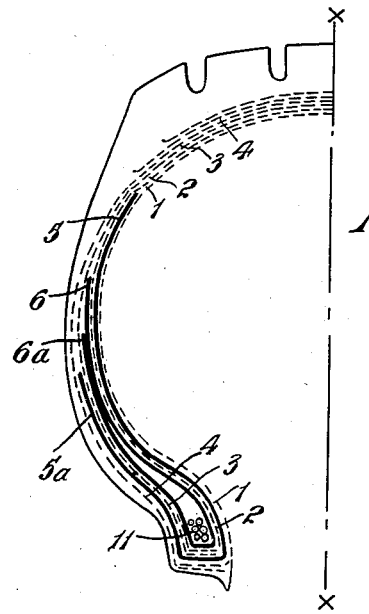
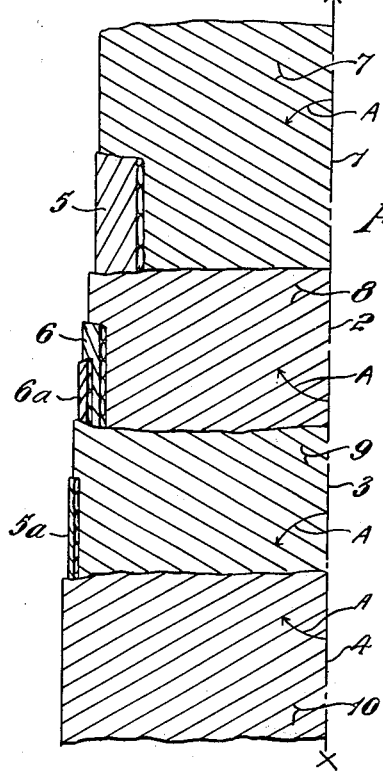

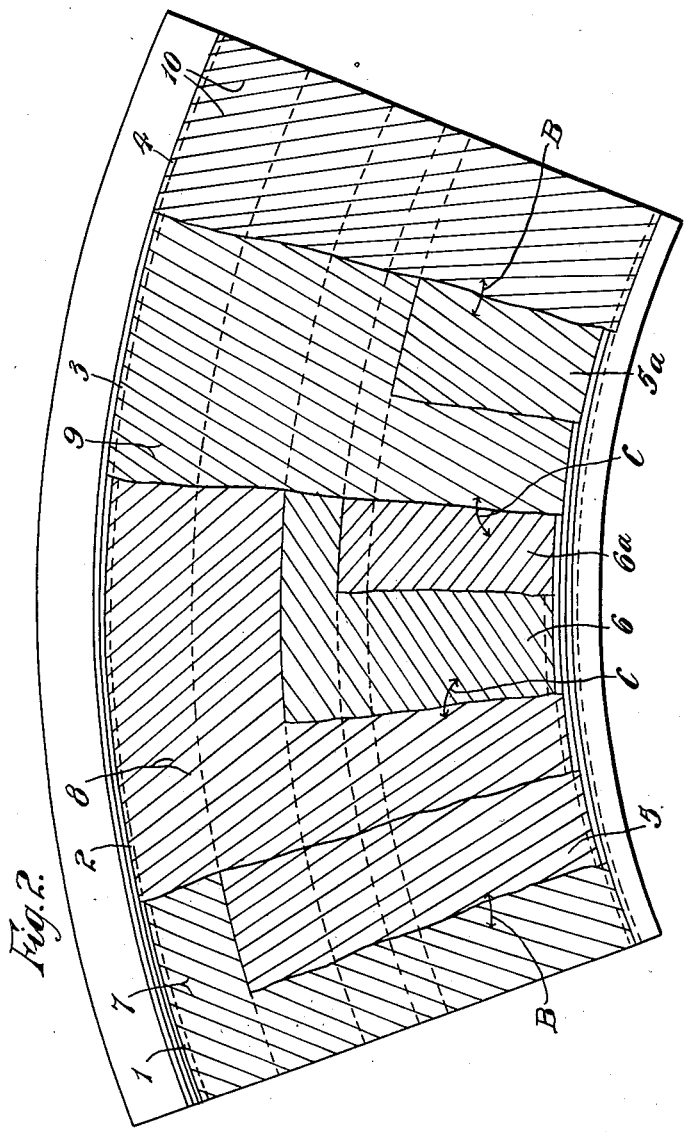

Dec. 8, 1936.　　　F. G. W. KING　　　2,063,105
PNEUMATIC TIRE COVER
Filed Feb. 14, 1936　　　3 Sheets-Sheet 3

Inventor
Frank G. W. King
by Usina & Rauber
his Attorneys

Patented Dec. 8, 1936

2,063,105

UNITED STATES PATENT OFFICE 2,063,105

PNEUMATIC TIRE COVER

Frank George William King, Sutton Coldfield, England, assignor to Dunlop Tire and Rubber Corporation, Buffalo, N. Y., a corporation of New York Application February 14, 1936, Serial No. 63,859
In Great Britain January 31, 1935

3 Claims. (Cl. 152—13)

The general type of pneumatic tire now made includes a tread which when the tire is inflated and in contact with the ground is stiffer and less flexible than the side walls, partly due to the bulk of tread rubber itself, and partly due to the varying tensions imparted to the various parts of the cord fabric of the tire of which those constituting the tread are comparatively highly stressed.

Such tensions, however, particularly in the tread, impart an undesirable stiffness or inflexibility to the tire which reduces the available cushioning capacity of just that part of the tire which by its contact with the road can exert a very pronounced influence upon the riding comfort of the passengers.

The present invention aims at an improved construction of pneumatic tire casing in which a greatly improved degree of riding comfort is obtained by permitting greater flexibility to the tread than has hitherto been possible without sacrificing and even with an increase in the stability of the side walls in their resistance both to lateral forces producing side roll at corners and to the circumferential torque stresses inseparable from acceleration and braking.

The above characteristics are also of particular value in tires intended for use on aeroplanes, where tire tread flexibility together with an increased factor of safety due to improved resistance to impact are of particular value.

According to my invention a pneumatic tire of the kind composed of superposed layers of bias cut fabric, the cords of which cross the mid-plane of the tire at a relatively large acute angle, is characterized by a plurality of side wall elements each comprising a layer of cords lying side by side, the cords in the respective elements being positioned at progressively decreasing and/or increasing angles relative to the cords of the casing plies and at opposite inclination thereto.

For example the warp threads of the bias cut fabric layers extending across the crown of the tire from bead to bead, may be arranged to cross the mid-plane of the tire at an angle of the order of 50° to 80° which may increase as the said threads approach the bead.

In order that the invention may be more easily understood and readily carried into effect, the same will now be described with reference to the accompanying drawings in which:—

Fig. 1 is a half sectional elevation of pneumatic tire constructed according to the invention; Fig. 2 is a part sectional side elevation of a segment of the tire shown in Fig. 1; Fig. 3 is a side view of a portion of a tire wall, certain plies being removed in part to show the relation of underlying plies; and Fig. 4 is a part perspective sectional view of the segment of the tire shown in Fig. 2.

The tire casing shown comprises four plies 1, 2, 3, and 4, each ply being composed of cords which are parallel to one another and which cross the mid-plane of the tire X. X. Fig. 3 at acute angles A, Fig. 3 of not less than 50°.

The cords 7 and 9 of plies 1 and 3 cross the mid-plane X. X. in one direction and the cords 8 and 10 of the plies 2 and 4 cross the line X. X. at the same angle A as the cords 1 and 3 but in the opposite direction.

In the construction shown, the ply 1 constitutes the inner wall of the casing and the ply 4 constitutes the outer wall of the casing.

In the preferred construction shown, we incorporate in each side wall looped reinforcing elements, 5, 5a, 6, 6a, which are interposed between the plies of the casing and extend radially outwards to varying heights from the inextensible bead members, one of which is shown at 11.

Alternatively, each of these continuous looped or double elements 5, 5a, and 6, 6a, may be split into separate elements, but it is preferable to form double elements as shown from one piece of cord fabric by looping the piece of cord fabric about the bead 11 to unequal extents, and by placing one such loop within another in the manner shown in which the looped elements 6, 6a, is positioned within the looped elements 5, 5a.

In order to increase the stiffening of the tire wall as its radius decreases and at the same time to progressively increase the resistance to tangential braking and acceleration forces, one of the elements as for instance 5, extends substantially to the shoulder of the casing, the element 6 to the widest part of the tire and the elements 6a and 5a terminate adjacent to the widest part of the tire but at lesser radial heights.

It will be understood, however, that if desired the elements whether of the preferred integral loop type shown, or whether formed from separate pieces may extend upwards within or upon the walls of the tire to a greater height at the middle of the tire wall than that to which they extend adjacent the inner and outer surfaces of the tire wall.

The cords of the elements 5 and 5a reinforce the plies 1 and 4 respectively, and the cords in the elements 6 and 6a reinforce the plies 2 and 3 respectively.

The cords of the elements 5 and 5a cross the cords of the plies 1 and 4 at angles B, Fig. 2, which are much less than the angles C, Fig. 2, at which the cords of the elements 6 and 6a cross the cords of the plies 2 and 3.

It will be understood that the progressive angular differences described above between the cords of each reinforcing element and the cords of the adjacent casing ply will be extended to any additional plies and reinforcing elements.

In the preferred construction shown, the cords of one portion 5a, of the double elements 5, 5a, Fig. 2, are oppositely inclined to the cords of the other portion 5, and the cords of one portion 6 of the double elements 6, 6a, are oppositely inclined to the cords of the other portion 6a, so that the cords of the individual elements cross one another at opposite inclinations to one another and to the cords of the casing plies.

It will be understood that by interchanging the elements 6 and 6a with the elements 5 and 5a, the relative magnitude of the angles B and C may be interchanged.

Where separate elements are employed, these may be butted together or overlapped beneath the inextensible beads 11 permitting the cord angles of each element to be different from one another. In this case the individual elements may be so cut on the bias that the angle made with the bead by the cords of successive elements may decrease progressively from the outer portion of the casing inwards or from the inner portion of the casing outwards.

In view of the more intimate contact of the outer lateral surface of the casing at its inner periphery with the bead seating surface and tire-retaining flange of a rim or hub, we may arrange to place a reinforcing element having cords tangential to the bead or approaching the bead at a small angle nearest the outer surface of the tire, to ensure the most direct transference of the acceleration stresses from the rim to those reinforcing elements having threads best adapted to withstand and transmit them to the body of the cover.

Having now particularly described my invention I claim:—

1. A pneumatic tire comprising an inextensible bead member, superposed layers of bias cut fabric the cords of which cross the mid-plane of the tire at a relatively large acute angle and a plurality of loops of bias cut fabric passing around said bead to form reinforcing elements each contacting at least on one side with one of said fabric layers and each comprising a layer of cords lying side by side at an opposite inclination to the cords of its contacting casing ply, the cords of adjacent elements of said loops being oppositely inclined to one another.

2. A pneumatic tire comprising a pair of inextensible bead members, superposed layers of bias cut fabric, the cords of which cross the mid-plane of the tire at a relatively large acute angle and are wrapped about said bead members alternately from opposite sides thereof and loops of bias cut fabric passing around said beads and extending upwardly on opposite sides thereof to form side wall reinforcing elements, the extensions of one loop of each bead placed between a pair of layers of said bias cut fabric on each respective side of said bead and contacting on each face therewith, said loops comprising a layer of cords lying side by side and extending substantially tangentially from said bead members and on opposite sides thereof the inclination of the cords of one loop being reverse to those of the next adjacent loop.

3. A pneumatic tire comprising a pair of inextensible bead members, superposed layers of bias cut fabric the cords of which cross the mid-plane of the tire at a relatively large acute angle, and loops of bias cut fabric passing around said bead members and extending upwardly on opposite sides thereof to form side wall reinforcing elements interleaved with said layers of bias cut fabric, said loops comprising each a layer of cords lying side by side and extending substantially tangentially from said bead members, the angle of inclination of one element of one loop being oppositely inclined to the angle of the next adjacent loop element, the inclination for each loop on opposite sides of said bead being reversed.

FRANK GEORGE WILLIAM KING.